May 23, 1950 P. J. KIRCHER 2,509,101
RELIEF PRESSURE VALVE FOR PRESSURE COOKERS
Filed May 8, 1945
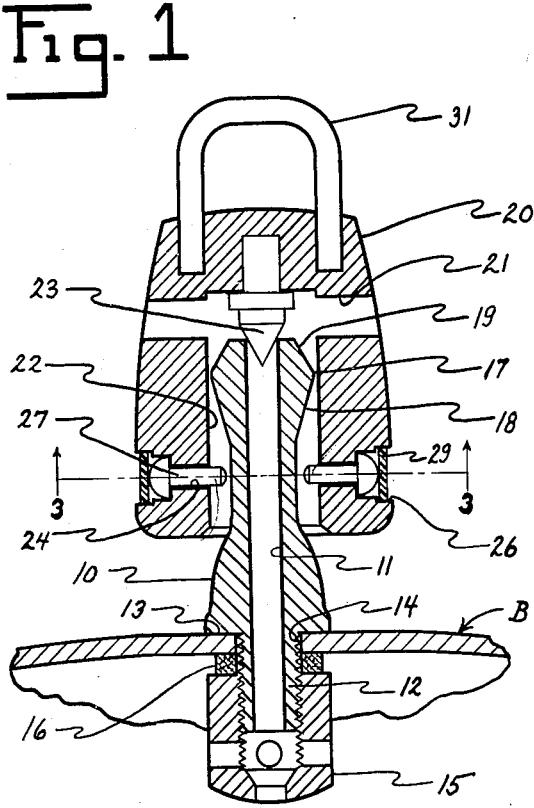
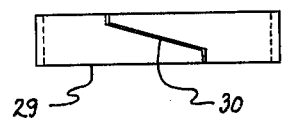
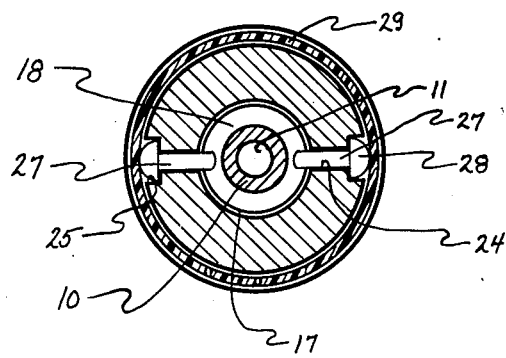
Inventor
Paul J. Kircher
By Lindsey and Robellard.
Attorney Patented May 23, 1950

2,509,101

UNITED STATES PATENT OFFICE 2,509,101

RELIEF PRESSURE VALVE FOR PRESSURE COOKERS

Paul J. Kircher, Plainville, Conn., assignor to Landers, Frary & Clark, New Britain, Conn., a corporation of Connecticut Application May 8, 1945, Serial No. 592,693

3 Claims. (Cl. 137—53)

This invention relates to relief pressure valves for pressure cookers of the type having a weighted valve head adapted to seat on the vent of a vent tube and mounted for movement up and down to regulate the steam pressure generated in the pressure cooker.

The aim of the invention is to provide, in a pressure relief valve, means of a simple and economical nature for preventing the weight carrying the valve head from becoming accidentally detached from the vent tube when excessive steam pressure within the cooker tends to blow the weight off of the tube, or when the vessel is tilted to reduce the pressure within the vessel, or for any other reason, and which is so constructed and arranged that the weight may be manually removed and replaced in an easy and quick manner for cleaning or other purposes, all without affecting or interfering in any way with the normal steam pressure regulating action of the valve.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a central vertical cross sectional view of the device shown in position on the cover of a steam pressure cooker;

Fig. 2 is a side view of a stud retaining ring; and

Fig. 3 is a horizontal cross sectional view taken on line 3—3 of Fig. 1.

In the present instance, my improved construction is shown (Fig. 1), for illustrative purposes, as secured to the cover B of a steam pressure cooker. The device comprises a vent tube 10 containing a vent passage or bore 11. The lower portion 12 of the vent tube is reduced in diameter, thus providing a shoulder 13 at the point of reduction. 14 designates a hole in cover B through which portion 12 extends downwardly. The portion 12 is externally threaded to receive a vented lock nut 15 adapted to bear against a gasket 16 resting between the lock nut and the underside of the cover B, shoulder 13 engaging the upper surface of cover B. The vent tube 10 has, adjacent its upper end, an annular ridge 17 which gradually decreases in diameter downwardly and upwardly from its central portion so as to provide oppositely disposed sloping sides 18 and 19. The device is further provided with a weight 20 vented as at 21 and surrounding the upper end of the vent tube which extends upwardly into the weight through a central bore 22 sufficiently greater in diameter than ridge 17 of the vent tube to permit free vertical movement of the weight with respect to the vent tube. Weight 20 is provided at the upper end of the bore 22 with a depending valve head 23 adapted to seat on the upper end of the vent passage 11, as shown in Fig. 1. There is further provided two radially extending holes 24 disposed in the weight below the ridged portion of the vent tube and countersunk, as at 25. Around the outside of weight 20 on a line with holes 24 is a peripheral groove or channel 26. Slidably disposed in holes 24 and extending at one end into central bore 22 are retaining studs or pins 27 having heads 28 at their other ends accommodated in the countersunk holes 25. Positioned in groove 26 is a resilient expansible retaining ring 29 (Fig. 2) which may be formed of plastic and which is split, as at 30, to allow for the expansion thereof. Ring 29 is adapted to engage the heads 28 of pins 27 and resiliently urge the pins inwardly so that the ends thereof extend into bore 22. Weight 20 is further provided with a loop 31 secured to its top.

Operation of the device is simple. When pressure above the operational level is developed in the pressure cooker, the weight 20 will be lifted by steam pressure through vent passage 11 on valve head 23 and thus the excess steam escapes through the vent passage and out of vents 21. When the pressure is reduced to operational level, the weight 20 drops back to seal the vent. The pins 27 do not impede in any way the tendency of weight 20 to "float" over vent tube 10. However, should the pressure become excessive, the ends of the pins protruding into bore 22 engage slope 18 on the vent tube and prevent the weight from being blown off or displaced from the vent tube. In the same manner, weight 20 will be retained over the vent tube if the vessel is tilted to allow the steam pressure to escape as, for example, at the close of the cooking operation. Also, the weight cannot be lost accidentally when the vessel is moved around or even turned upside down. However, the weight can easily be removed by the operator by simply pulling on the loop 31. When sufficient force is applied, the pins 27, upon engaging slope 18, will be cammed outwardly and will ride over the ridge 17, thus permitting removal of the weight. The resilient ring 29 acts to retain the pins in position and at the same time to permit them to be cammed outwardly upon application of sufficient force of pull on loop 31. The weight can be replaced by simply pressing it downward onto the vent tube whereby the ends of the pins will engage slope 19 and be cammed outwardly and ride over ridge 17, being sprung back into bore 22 by the spring action of the ring 29 whereupon they will again serve to prevent detachment of the weight as hereinabove described.

It will be seen that this retaining means is simple in construction, inexpensive of manufacture and yet that it is effective to prevent the accidental loss of the weight or the displacement thereof during operation of the pressure cooker.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a relief pressure valve for pressure cookers, a vent tube having a vertical vent passage, said tube having an elongated, generally cylindrical outer surface and an annular ridge adjacent its upper end provided with oppositely facing sloping sides, a weight having a central bore of greater diameter than the diameter of said ridge whereby the weight is freely movable on the vent tube, said weight being constructed and arranged to surround the upper end of said vent tube and being provided with a valve head adapted to seat on the upper end of said vent passage when the weight is in its lowermost position, radially disposed and inwardly extending pins slidably mounted on said weight and adapted to extend into said bore, means limiting inward movement of the pins so as to prevent engagement of the pins with said cylindrical surface of the vent tube but permitting engagement with said ridge, and spring means for resiliently urging said pins into said bore, said pins being located in a radial plane spaced from the ridge when the weight is in said lowermost position on the vent tube so as to permit free vertical movement of the weight sufficient to vent the cooker, said spring means being constructed and arranged to urge said pins into said bore to engage the ridge with sufficient force to prevent removal of the weight from the vent tube during venting of the cooker but with insufficient force to prevent manual removal and replacement of the weight.

2. In a relief pressure valve for pressure cookers, a vent tube having a vertical vent passage, said tube having an elongated, generally cylindrical outer surface and adjacent the upper end thereof a portion of gradually increasing diameter upwardly followed by a portion of gradually decreasing diameter, a vented weight having a central bore adapted to receive the upper end of said tube and of greater diameter than the maximum diameter thereof whereby the weight is freely movable on the vent tube, said bore being provided with a depending valve head at the upper end thereof adapted to seat on the upper end of said vent passage when the weight is in its lowermost position, radially disposed and inwardly extending pins slidably mounted on said weight and adapted to extend into said bore, means limiting inward movement of the pins so as to prevent engagement of the pins with said cylindrical surface of the vent tube by permitting engagement with said portion of increased diameter, and a resilient expansible ring about said weight and urging said pins into said bore, said pins being located in a radial plane spaced from the portion of increased diameter when the weight is in said lowermost position on the vent tube so as to permit free vertical movement of the weight sufficient to vent the cooker, said expansible ring being constructed and arranged to urge said pins into said bore to engage the portion of increased diameter with sufficient force to prevent removal of the weight from the vent tube during venting of the cooker but with insufficient force to prevent manual removal and replacement of the weight.

3. In a relief pressure valve for pressure cookers, a vent tube having a vertical vent passage, said tube having an elongated, generally cylindrical outer surface and an annular ridge portion at its upper end with oppositely facing sloping sides, a vented weight having a central bore adapted to receive the upper end of said tube and of greater diameter than the maximum diameter of said upper portion of said vent tube whereby the weight is freely movable on the vent tube, said weight having a depending valve head secured thereto at the top of said bore, said valve head being seated on the upper end of said vent passage when the weight is in its lowermost position, radially disposed and inwardly extending pins slidably mounted in said weight and adapted to extend into said bore and having heads at their outer ends, means on the weight adapted to engage the heads of the pins to limit inward movement of the pins so as to prevent engagement of the pins with said cylindrical surface of the vent tube by permitting engagement with said annular ridge portion, an annular channel around said weight adjacent said pins, and a resilient split ring in said channel and engaging the heads of the pins for resiliently urging said pins into said bore, said pins being located in a radial plane spaced from the ridge portion when the weight is in said lowermost position on the vent tube so as to permit upper vertical movement of the weight sufficient to vent the cooker, said resilient split ring being constructed and arranged to urge said pins into said bore to engage the ridge portion of the vent tube with sufficient force to prevent removal of the weight from the vent tube during venting of the cooker but with insufficient force to prevent manual removal and replacement of the weight.

PAUL J. KIRCHER.

REFERENCES CITED

The following references are of record in the file of this patent:

UNITED STATES PATENTS

| Number | Name | Date |
|---|---|---|
| 389,404 | O'Neill | Sept. 11, 1888 |
| 2,200,903 | Stephens | May 14, 1940 |
| 2,315,455 | Sale | Mar. 30, 1943 |
| 2,320,360 | Grey | June 1, 1943 |

FOREIGN PATENTS

| Number | Country | Date |
|---|---|---|
| 1,308 | Great Britain | Apr. 2, 1879 |
| 78,173 | Austria | Sept. 10, 1919 |
| 161,368 | Great Britain | Apr. 14, 1921 |